Jan. 21, 1936.   E. R. BERGMANN   2,028,433
SHAKER CONVEYER
Filed March 5, 1934   2 Sheets-Sheet 1
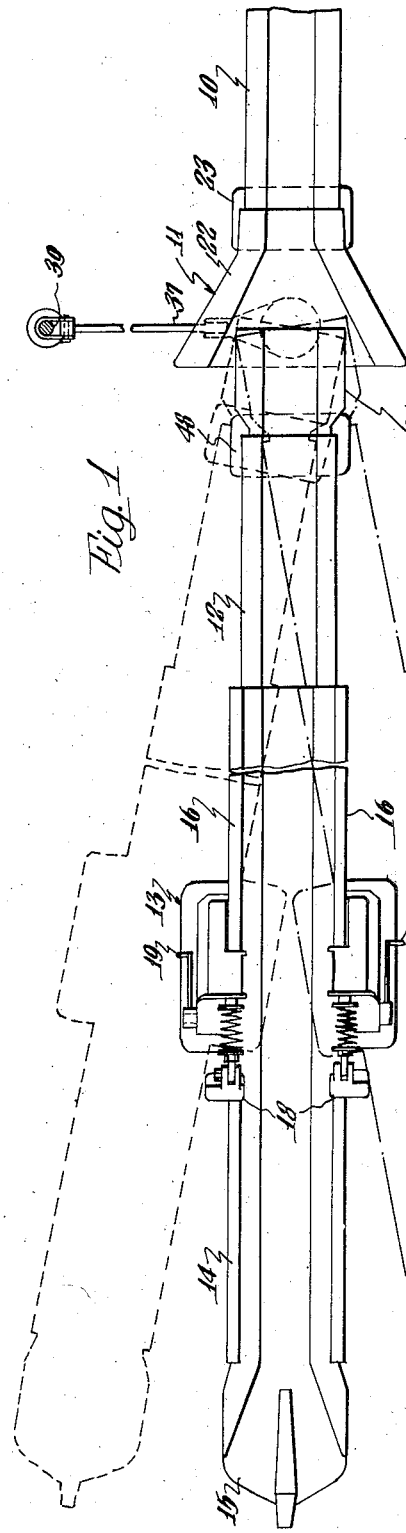
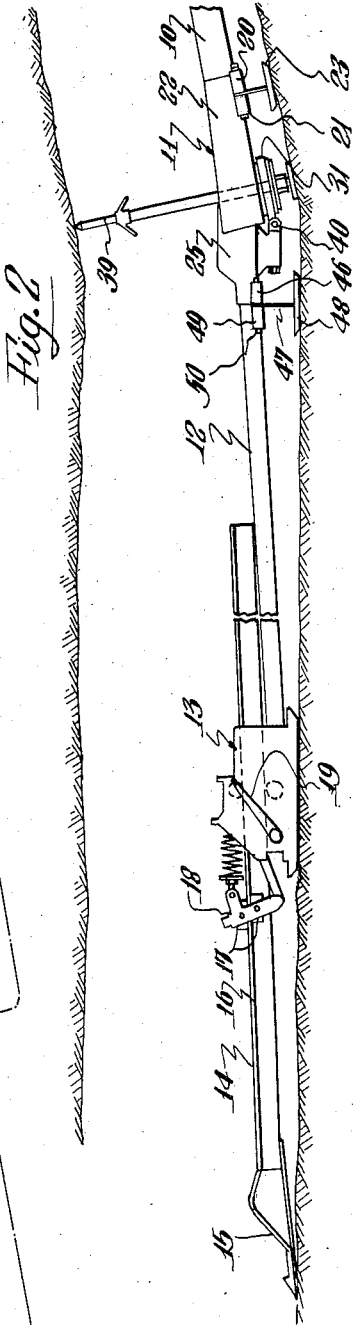
Inventor
Ernst R Bergmann
Clarence F. Poole
Attorney Jan. 21, 1936.  E. R. BERGMANN  2,028,433
SHAKER CONVEYER
Filed March 5, 1934  2 Sheets-Sheet 2
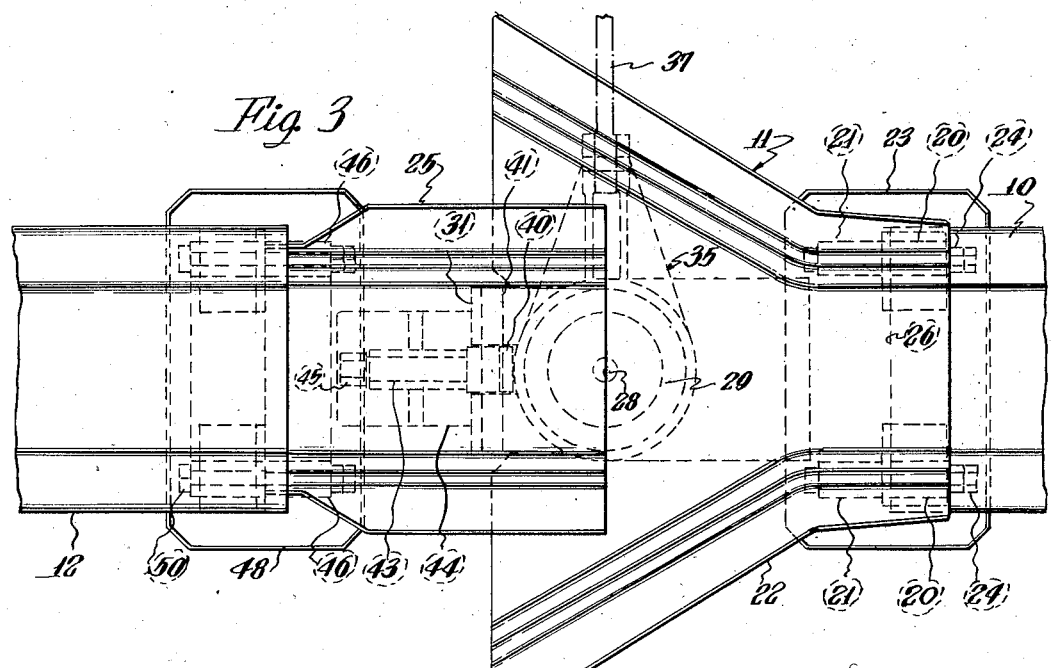
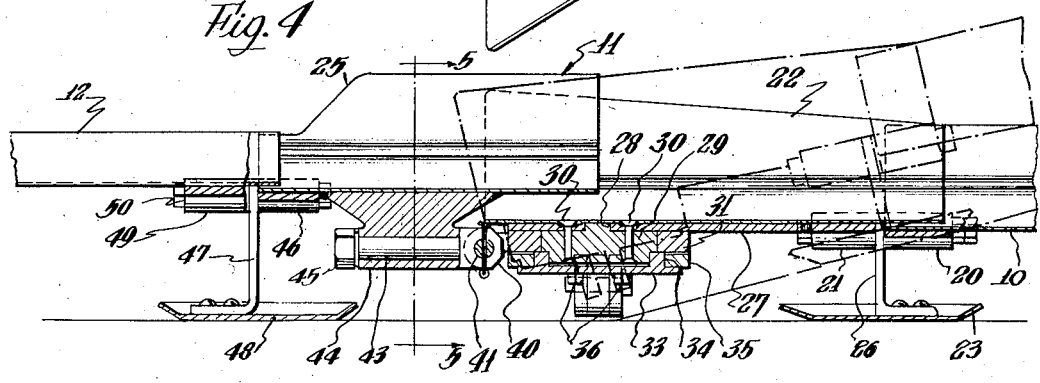
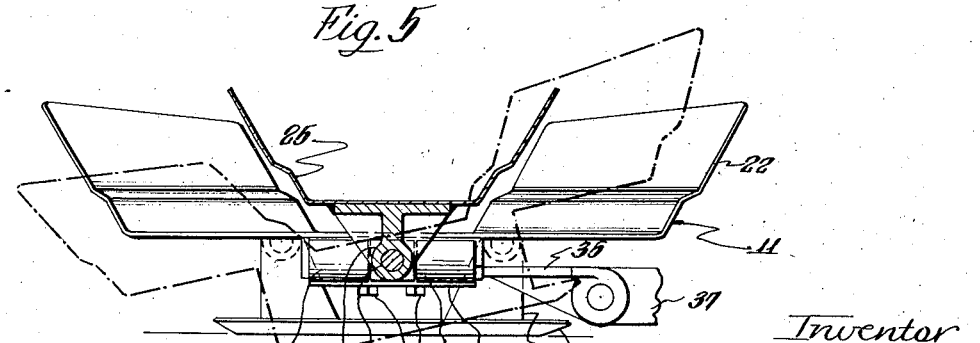
Inventor
Ernst R. Bergmann
Clarence T. Poole
Attorney Patented Jan. 21, 1936

2,028,433

UNITED STATES PATENT OFFICE 2,028,433

SHAKER CONVEYER

Ernst R. Bergmann, Chicago, Ill., assignor to Goodman Manufacturing Company, Chicago, Ill., a corporation of Illinois Application March 5, 1934, Serial No. 714,040

9 Claims. (Cl. 198—220)

This invention relates to improvements in shaker conveyers and has as its principal object to provide a swivel connection in a shaker conveyer pan line permitting universal pivotal movement of one pan with respect to the next adjacent pan which connection is particularly adapted for use with a feeder head for accommodating said feeder head to uneven bottoms and pitching seams.

Other objects of my invention will appear from time to time as the following specification proceeds My invention may be more clearly understood with reference to the accompanying drawings wherein:

Figure 1 is a top plan view of a conveyer pan line embodying my invention with parts broken away;

Figure 2 is a side elevation of the apparatus shown in Figure 1;

Figure 3 is an enlarged detail plan view of the swivel connection shown in Figure 1;

Figure 4 is a side elevation of the device shown in Figure 3 with certain parts shown in longitudinal section; and Figure 5 is a sectional view taken substantially along line 5—5 of Figure 4.

In the drawings the embodiment of my invention illustrated includes a reciprocatory shaker conveyer pan line including a trough section 10 driven in the usual manner, not shown. The trough section 10 has a horizontal swivel section, generally indicated by reference character 11, detachably secured to the forward end thereof. An extension pan 12 is detachably secured to the forward end of said swivel section and a feeder head 13 is secured to the forward end of said pan 12 for reciprocable movement with all of the parts named. The feeder head 13 may be of a usual construction and operation well known to those skilled in the art and is adapted to carry an extensible pan 14 having a shovel 15 formed integral with its forward end for picking up material for discharge into the extension pan 12. As herein shown, the extensible pan 14 is provided with plates 16, 16 extending along each side thereof, which plates are adapted to be selectively engaged by means of grip blocks 17, 17 carried on carrier members 18, 18. Operating levers 19, 19 are provided for engaging the grip blocks 17, 17 with the plates 16, 16 in the usual manner at certain portions of the forward or return stroke of the shaker conveyer, through a suitable system of levers, which will not herein be described since it is no portion of my present invention.

With reference now in particular to the details of the swivel section 11 and several of the novel features of my invention, the latter includes a relatively short flaring trough section 22 connected to the main trough section 10 by a usual detachable means, herein consisting of a pair of bolts 24, 24 extending through eyes 21, 21 depending and extending laterally from the bottom of said trough section 22, and similar eyes 20, 20 formed on the main trough section 10. A shoe 23 adapted to rest on and slide along the mine bottom has an upstanding support 26 secured thereto, which is interposed between the trough 10 and trough section 22 and has apertures registering with the eyes 20 and 21 of said trough sections.

The rear portion of the trough section 22 is nested within the forward end of the trough 10, and its forward flared end is of a substantial width to permit another trough section 25 to overlap said flared end and discharge material therein when the adjoining troughs are pivotally moved at various angles with respect to each other.

The swivel connection includes a reinforcing plate 27, secured to the under side of the trough section 22 and provided with a bored portion 28 adapted to receive a lug extending upwardly from a bearing boss 29, which bearing boss is secured to the under face of the reinforcing plate 27 in any suitable manner, as by rivets 30, 30 (see Figure 4). An annular member 31 is journaled on the bearing boss 29 and its upper surface abuts the under surface of the reinforcing plate 27. A retaining plate 33 having an annular flange 34 extending upwardly therefrom is provided for holding the member 31 in position on the bearing boss 29 and permitting said member to be pivotally moved with respect to said bearing boss. The outer periphery of the annular flange 34 also serves as a bearing member for a link member 35 and the portion of the retaining ring 33 extending outwardly beyond said annular flange, is adapted to abut the under side of said link member. The retaining member 33 is herein shown as being secured to the under side of the bearing boss 29 by means of cap screws 36, 36 in a suitable manner. Thus, the member 31 and link member 35 are adapted to be pivotally moved with respect to the trough section 22 about an axis extending perpendicularly to the bottom surface thereof.

A connecting bar 37, commonly referred to as a pendulum, is adapted to be pivotally connected to the outer end of link member 35. The pendulum 37 is also pivotally secured to a jack 39, which may be interposed between the mine roof and mine bottom in such a manner that said pendulum holds the trough 10 and trough section 22 from lateral movement with respect to the ground, but permits the usual reciprocable action of the main pan line, as well as lateral rocking movement of the pan line, as will further appear.

The member 31 has a forward extension to which a member 40 is pivotally connected by means of a pin 41 horizontally disposed to support the member 40 for pivotal movement with respect to the member 31 in a vertical plane. The member 40 has a spindle or shaft 43 formed integral therewith and extending forwardly into a longitudinally bored portion of a member 44 secured to and depending from the forward trough section 25 and so arranged as to support the rearward end of said forward trough section above the rearward trough section 22, a distance sufficient to permit free pivotal movement of said sections with respect to each other in a vertical plane. A nut 45 is threaded on the end of the shaft 43 for retaining said shaft in member 44.

It is thus apparent that the trough sections 25 and 22 may have limited universal movement with respect to each other, since they have pivotal movement on a vertical axis disposed rearwardly of the forward end of the trough section 22, about an axis extending transversely of said trough section 25 disposed adjacent the forward end of said trough section 22, and about an axis extending longitudinally of said trough section 25 disposed forwardly of the forward end of said trough section 22. Thus, the trough sections 22 and 25 may be disposed in various angular relations with respect to each other for the discharge of material from the forward into the rearward trough section in all conceivable positions of adjustment of said trough sections with respect to each other and permitting the pan line to accommodate itself to irregular mine bottoms as well as to permit the trough section to be pivoted with respect to each other for conveying material around corners where desired.

It may also be desirable to provide a sliding support 48 for the pan line in advance of the universal connection just described. For this purpose a pair of elongated eyes 46, 46 depend and extend laterally from the bottom of the forward trough section 25 and are adapted to register with suitable apertures formed in a flange 47 extending upwardly from a ground engaging shoe 48 and elongated eyes 49, 49 depending from and extending laterally from the bottom of the extension pan 12 and abutting the forward end of said flange so that suitable connecting bolts 50, 50 may connect said extension pan and shoe to said forward trough section in a usual manner.

It may now be seen that a universal swivel connection of a novel, efficient and simple construction has been provided for a shaker conveyer pan line, to permit the pan line to accommodate itself to uneven bottoms and seams pitching in various relationships with respect to each other. Said swivel is particularly adapted for use with a feeding head of the type described for permitting a shovel carried by said feeding head to gather material for discharge into the main pan line where the seams are pitching or the bottom is irregular and it will further be seen that my invention accordingly permits the use of a feeding head and shaker conveyer in more places than formerly and improves the operation of shaker conveyers, especially where bottom conditions are irregular and where top conditions are such that numerous props are necessary and many turns in the pan line are necessary to avoid the props supporting the roof, it being understood that more than one swivel may be used under such conditions.

While I have herein shown and described one form in which my invention may be embodied, it will be understood that the construction and arrangement of the various parts may be changed or altered without departing from the spirit or scope thereof. Furthermore, I do not wish to be construed as limiting myself to the precise construction illustrated, excepting as it may be limited in the appended claims.

I claim as my invention:

1. A universal swivel for a shaker conveyer trough line including a trough section, another trough section adapted to discharge into said first-mentioned trough section, and a connection between said trough sections permitting said second-mentioned trough section to pivot about a vertical axis, a horizontal axis disposed forwardly of said vertical axis and transversely of said second-mentioned trough section, and a longitudinal axis pivotally movable about said transverse axis and disposed forwardly of and perpendicular to said transverse axis.

2. A universal swivel for a shaker conveyer trough line including a trough section having an outwardly flared forward end and a rearward end adapted to be detachably secured to a conveyer trough, another trough section overlapping the bottom of said first-mentioned trough section, and disposed thereabove, and a pivotal connection between said trough sections permitting said second-mentioned trough section to be pivotally moved with respect to said first-mentioned trough section about a vertical axis, about a horizontal axis disposed transversely of said second-mentioned trough section and forwardly of said vertical axis, and a longitudinal axis pivotally movable about said transverse axis and disposed forwardly of and perpendicular to said transverse axis.

3. In a swivel for a shaker conveyer trough line, a shoe adapted to be slidably moved along the mine bottom, a trough section having an outwardly flared forward end and a rearward end adapted to be detachably connected to a conveyer trough and supported on said shoe, another shoe adapted to slidably engage the mine bottom, a forward trough section adapted to be supported adjacent its forward end on said shoe and extending over the flared forward end of said first-mentioned trough section and a connection between said trough sections permitting said forward trough section to be pivotally moved with respect to said first-mentioned trough section about a vertical axis, about a horizontal axis disposed transversely of said forward trough section and forwardly of said vertical axis and a longitudinal axis pivotally movable about said transverse axis and disposed forwardly of and perpendicularly to said transverse axis.

4. In combination with a shaker conveyer including a conveyer trough, mechanism for picking up and loading loose material including an extension trough, a feeder head connected thereto, and an extensible trough nested in said extension trough and adapted to be extended from or retracted within said extension trough by means of said feeder head, and a universal swiveled connection between said extension trough and conveyer trough to permit said picking-up mechanism to conform to an uneven bottom including a jack, a pendulum pivotally connected thereto for movement about a vertical axis, a trough section detachably secured to said conveyor trough, a pivotal connection between said pendulum and trough section, a trough section secured to the rearward end of said extension trough, and a pivotal connection between said trough sections permitting said second-mentioned trough section to pivot about a vertical axis, about a horizontal axis disposed transversely of said second-mentioned trough section and forwardly of said vertical axis, and about a longitudinal axis pivotally movable about said transverse axis and disposed forwardly of and perpendicular to said transverse axis.

5. In a swivel for a shaker conveyer trough line, a shoe adapted to be slidably moved along the mine bottom, a trough section having an outwardly flared forward end and a rearward end adapted to be supported on said shoe and detachably connected to a conveyer trough, another shoe adapted to slidably engage the mine bottom, a forward trough section adapted to be supported adjacent its forward end on said shoe and extending over the flared forward end of said first-mentioned trough section, and a connection between said trough sections permitting said forward trough section to be pivotally moved with respect to said first-mentioned trough section about a vertical axis disposed rearwardly of the forward end of said first-mentioned trough section, about an axis extending transversely of said trough section and disposed adjacent the forward end of said first-mentioned trough section and about an axis extending longitudinally thereof disposed forwardly of the forward end of said first-mentioned trough section.

6. In a swivel for a shaker conveyer trough line, a trough section having an outwardly flared forward end and a rearward end adapted to be detachably connected to a conveyer trough, a member journaled to the underside of said trough section for rotation with respect thereto about a vertical axis, another member pivotally connected to said first-mentioned member for pivotal movement with respect thereto about a horizontal axis, a forward trough section having a discharge end disposed above the bottom of said first-mentioned trough section, and a pivotal connection between said trough section and said last-mentioned member permitting pivotal movement of said trough section with respect to said member about an axis perpendicular to the axis of pivotal connection of said second-mentioned member to said first-mentioned member.

7. In a swivel for a shaker conveyer trough line, a trough section having an outwardly flared forward end and a rearward end adapted to be detachably connected to a conveyer trough, a member journaled to the underside of said trough section for rotation with respect thereto about a vertical axis, a pendulum pivotally connected to said trough for pivotal movement with respect thereto about an axis coaxial with the axis of pivotal movement of said member, a jack connected with said pendulum and adapted to be interposed between the mine roof and bottom, another member pivotally connected to said first-mentioned member for pivotal movement with respect thereto about a horizontal axis, a forward trough section having a discharge end disposed above the bottom of said first-mentioned trough section, and a pivotal connection between said trough section and said last-mentioned member permitting pivotal movement of said trough section with respect to said member about an axis perpendicular to the axis of pivotal connection of said second-mentioned member to said first-mentioned member.

8. In a swivel for a shaker conveyer trough line, a trough section having an outwardly flared forward end and a rearward end adapted to be detachably conected to a conveyer trough, a shoe slidable on the mine bottom adapted to be connected with the rearward end of said trough section for spacing said trough section above the mine bottom, a member journaled to the underside of said trough section for rotation with respect thereto about a vertical axis, another member pivotally connected to said first-mentioned member for pivotal movement with respect thereto about a horizontal axis, a forward trough section having a forward end adapted to be detachably secured to a conveyer trough and having a discharge end disposed above the bottom of said first-mentioned trough section, a shoe for supporting the forward end of said forward trough section above the mine bottom, and a pivotal connection between said trough section and said last-mentioned member permitting pivotal movement of said trough section with respect to said member about an axis perpendicular to the axis of pivotal movement of said second-mentioned member with respect to said first-mentioned member.

9. In a swivel for a shaker conveyer trough line, a trough section having an outwardly flared forward end and a rearward end adapted to be detachably connected to a conveyer trough, a shoe slidable on the mine bottom adapted to be connected with the rearward end of said trough section for spacing said trough section above the mine bottom, a member journaled to the underside of said trough section for rotation with respect thereto about a vertical axis, a pendulum pivotally connected to said trough for pivotal movement with respect thereto about an axis coaxial with the axis of pivotal movement of said member, a jack adapted to be interposed between the mine roof and bottom connected with said pendulum, another member pivotally connected to said first-mentioned member for pivotal movement with respect thereto about a horizontal axis, a forward trough section having a forward end adapted to be detachably secured to a conveyer trough and having a discharge end disposed above the bottom of said first-mentioned trough section, a shoe for supporting the forward end of said forward trough section above the mine bottom, and a pivotal connection between said trough section and said last-mentioned member permitting pivotal movement of said trough section with respect to said member about an axis perpendicular to the axis of pivotal movement of said second mentioned member with respect to said first mentioned member.

ERNST R. BERGMANN.